United States Patent [19]

Frantz

[11] 4,230,156

[45] Oct. 28, 1980

[54] SOLENOID-ACTUATED VALVE

[75] Inventor: Virgil L. Frantz, Salem, Va.

[73] Assignee: Graham-White Sales Corporation, Salem, Va.

[21] Appl. No.: 952,091

[22] Filed: Oct. 17, 1978

[51] Int. Cl.³ .................. F16K 11/04; F16K 31/02
[52] U.S. Cl. ........................ 137/625.5; 137/625.65; 251/129; 251/139; 251/141; 335/250
[58] Field of Search .............. 137/625.5, 625.65; 251/129, 139, 141; 335/250, 260

[56] References Cited

U.S. PATENT DOCUMENTS

| 2,887,126 | 5/1959 | Frantz | 251/139 X |
| 3,377,046 | 4/1968 | Frantz et al. | 137/625.65 X |
| 3,446,246 | 5/1969 | Huley | 251/139 X |
| 3,588,039 | 6/1971 | Chelminski et al. | 251/141 |

FOREIGN PATENT DOCUMENTS

| 2305124 | 8/1974 | Fed. Rep. of Germany | 137/625.65 |
| 2321021 | 11/1974 | Fed. Rep. of Germany | 137/625.65 |
| 2361591 | 6/1975 | Fed. Rep. of Germany | 137/625.65 |

*Primary Examiner*—Gerald A. Michalsky
*Attorney, Agent, or Firm*—Wilmer Mechlin

[57] ABSTRACT

A three-way normally closed or open solenoid-actuated valve having the solenoid coil wound on a spool and therewith inserted uncoated through a side into a solenoid housing and in place encapsulated in an epoxy resin for protecting the coil and by wedging the spool against relative movement in the housing, enabling its cylindrical bore to act as a fixed guideway for receiving and guiding a reciprocable solenoid plunger. Upper and lower O-rings, the lower encapsulated with the spool and coil, seal against leakage of fluid from the solenoid housing.

6 Claims, 4 Drawing Figures

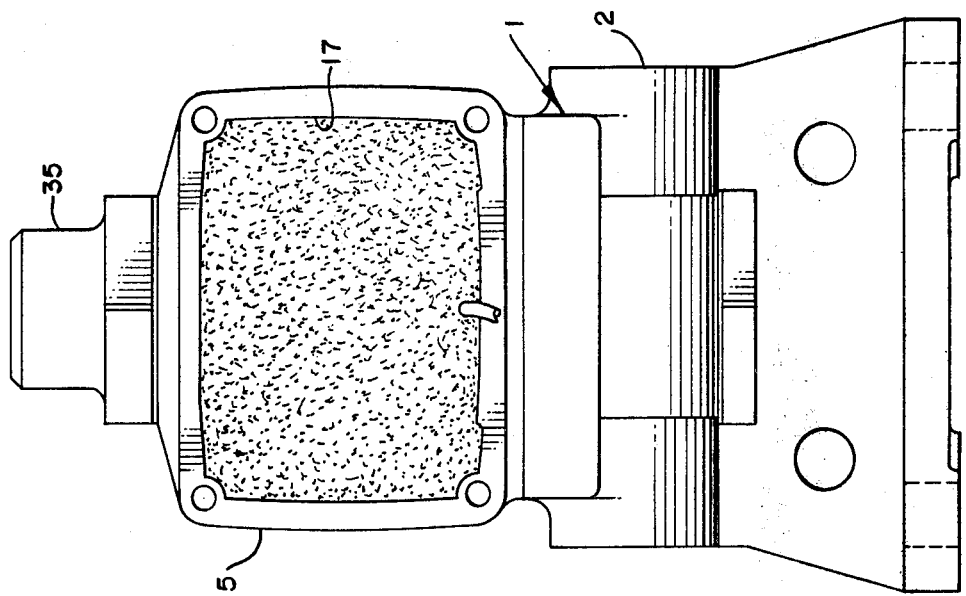
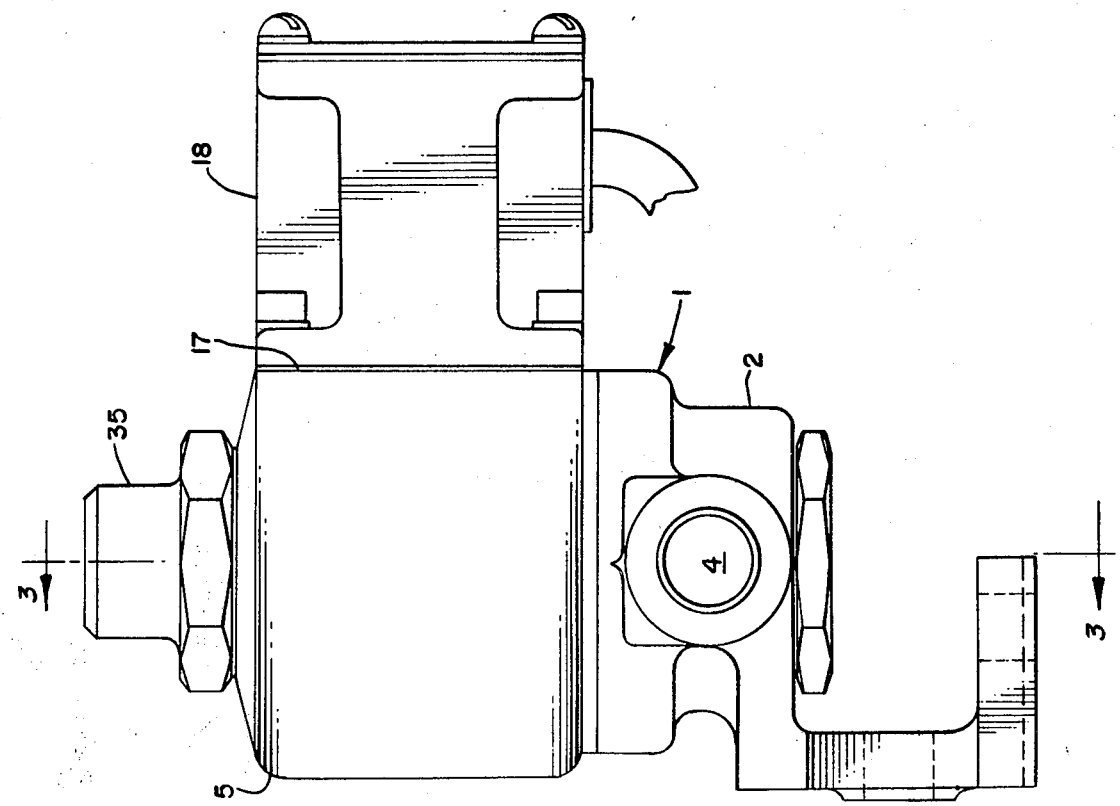

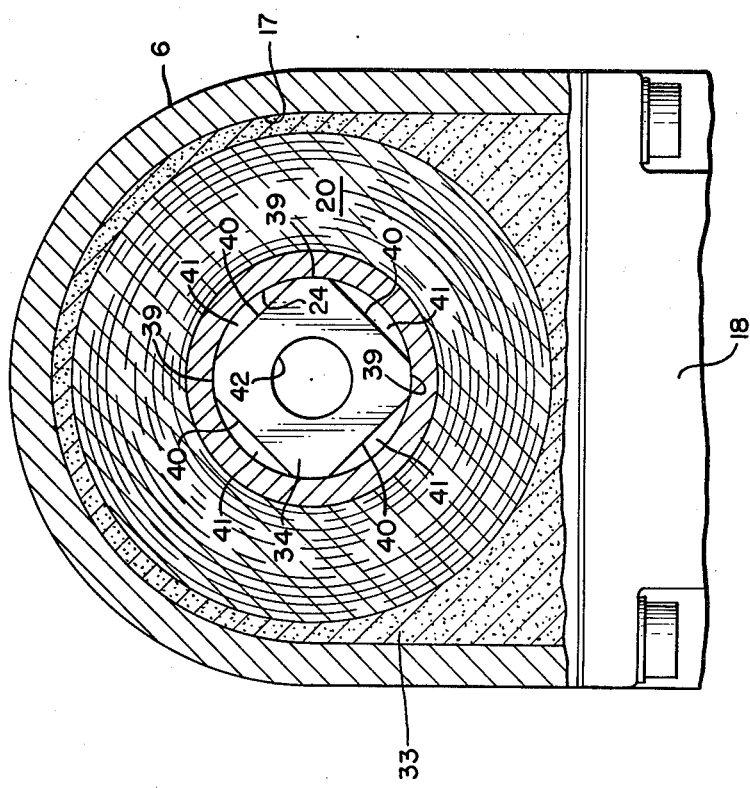
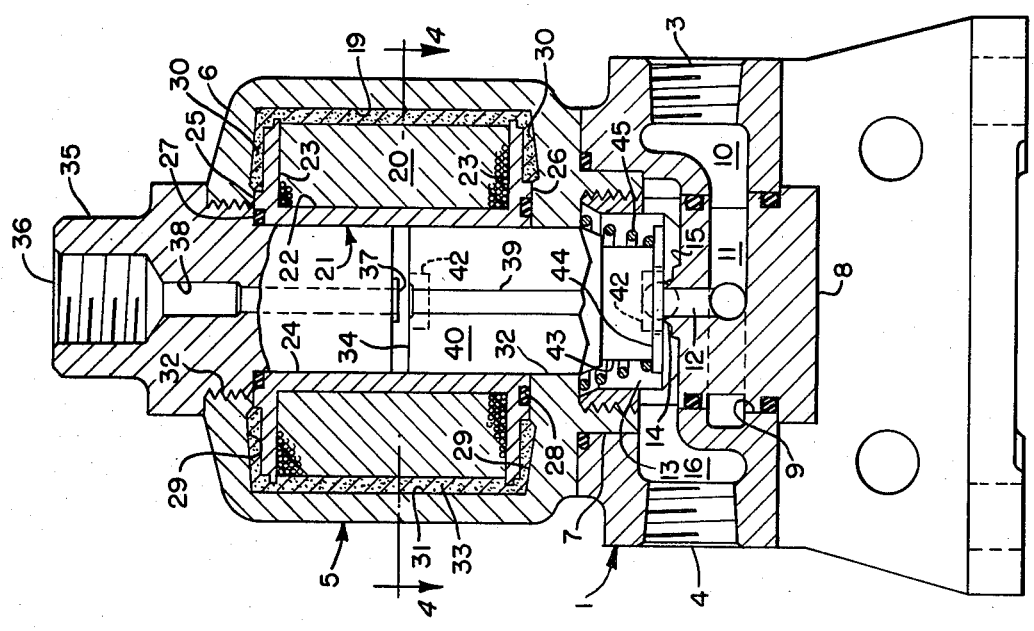

SOLENOID-ACTUATED VALVE

BACKGROUND OF THE INVENTION

Heretofore, as in Frantz et al U.S. Pat. No. 3,377,046, a coil of a solenoid-actuated valve has been wound on a spool and inserted uncoated with the spool into a pocket in a solenoid housing where it is encapsulated in an epoxy or like resin for protectively sealing the coil. Prior to the insertion, the surface of the pocket is sprayed with a release agent for preventing the resin from bonding to the housing and being cracked by the difference between its and the housing's coefficients of expansion. In the valve of the patent the solenoid plunger reciprocates in a lower part of the bore of the spool and the resin coating locks the spool against vertical movement relative to the housing. However, a coil pole seating in the upper part of the bore is depended on for locking the spool against relative lateral movement. It is to an improvement on the solenoid valve of the Frantz et al patent that the present invention is particularly directed.

SUMMARY OF THE INVENTION

The primary object of the present invention is to provide an improved solenoid-actuated valve, wherein a solenoid coil wound on a spool is inserted uncoated into a housing and there encapsulated in a protective resin and the resin without bonding to the housing locks the spool against both vertical and lateral movement.

Another object of the invention is to provide an improved solenoid-actuated valve according to the preceding object, wherein the solenoid plunger reciprocates in a lower part of the bore of the spool and leakage of fluid from the housing is prevented by O-rings between upper and lower ends of the spool and the housing, and the lower O-ring is locked in place by the encapsulating resin.

An additional object of the invention is to provide an improved solenoid-actuated valve wherein the solenoid coil is wound on a spool and inserted uncoated into a solenoid housing for encapsulation in place in an epoxy or like resin injected into the housing after a preliminary spraying of the inner surface of the housing with a release agent, and confronting end surfaces of the spool and housing form inwardly flaring wedge-shaped slots backed inwardly by end abutments on the spool for enabling the resin on filling the slots to wedge the spool against both vertical and lateral movement relative to the housing.

Other objects and advantages of the invention will appear hereinafter in the detailed description, be particularly pointed out in the appended claims, and be illustrated in the accompanying drawings, in which:

FIGURE DESCRIPTION

FIG. 1 is a front elevational view of a preferred embodiment of the improved solenoid-actuated valve of the present invention;

FIG. 2 is a side elevational view of the structure of FIG. 1 with the junction box removed;

FIG. 3 is a vertical sectional view taken along lines 3—3 of FIG. 1; and

FIG. 4 is a horizontal sectional view taken along lines 4—4 of FIG. 3.

DETAILED DESCRIPTION

Referring now in detail to the drawings in which like reference characters designate like parts, the improved solenoid-actuated valve of the present invention is adapted for installations in which an alternately open and closed valve actuated by a solenoid can be used to advantage.

In the embodiment illustrated as exemplary of the invention, the improved solenoid-actuated valve, designated as 1, is comprised of a base or mounting bracket 2 having suitably oppositely directed inlet and outlet ports 3 and 4, respectively, and supporting and surmounted by a housing 5 of a solenoid 6. With a downstanding concentric annular boss 7 seated or received in the upper end of the base 2, the housing 5 is removably mounted on the base by a headed central connecting plug 8 inserted from below into a central vertical or axial bore 9 in the base and extending upwardly into and threadedly engaging or screwed to the boss, with the joints between the base and the housing and plug O-ring or otherwise suitably gasketed. The inlet port 3 opens through an inlet passage 10 in the base and radial drillings 11 and an axial drilling 12 in the plug 8 onto a valve chamber 13, also in the plug, through a valve seat 14 concentric with the plug and upstanding into the valve chamber from a bottom wall 15 thereof. In turn, the outlet port 4 opens onto the valve chamber 13 through an outlet passage 16.

The solenoid housing 5 has a side opening 17 normally closed by a junction box 18 releasably attached, as by bolting, to the housing, and houses or contains in a compartment or enclosure 19 a coil 20 prewound on a spool 21 and inserted with the spool into the compartment through the side opening before the junction box is attached. The spool 21 has a cylindrical barrel or cylinder 22 and annular end flanges or rims 23 integral with and extending radially from the barrel and the coil 20 is wound on the barrel between the end flanges. With a cylindrical central bore 24, the spool 21 has at opposite ends upper and lower annular abutments or ribs 25 and 26, respectively, backed by or mounted on and projecting vertically from the end flanges, the upper abutment radially outset from the bore for accommodating therebetween an upper O-ring 27 and the lower abutment bifurcated for receiving a lower O-ring or other suitable resilient seal 28.

For engagement by the end abutments 25 and 26, the end surfaces 29 of the compartment 19, over their areas adjoining the bore 24 of the spool 21, preferably are flat and parallel. However, beyond or outwardly of the abutments 25, each of the end flanges 23 and the confronting end surface 29 of the compartment 19, are so configured as to form at each end of the spool, an inwardly flaring wedge-shaped annular slot or pocket 30 bounded or terminated inwardly by the adjoining abutment. If, as preferred, the radially extending end flanges 23 of the spool 21 are parallel, the wedge-shaped slots 30 conveniently are formed by recessing the end surfaces 29 beyond or outwardly of the abutments, with the end surfaces over their recessed areas converging or tapering toward their outer ends relative to each other and individually relative to the adjoining of the end flanges.

In assembling the solenoid 6, the spool 21, with the coil 20 wound thereon but uncoated and the lower O-ring 28 in place in the bifurcated lower abutment 26, is inserted or slid through the side opening 17 into the compartment 19 in housing 5 and substantially centered on the compartment with the spool's end abutments 25 and 26 substantially contacting or engaging the flat inner areas of the compartment's end surfaces 29. Compressed when or as inserted, the lower O-ring 28 in place is sufficiently compressed to effectively seal between the lower end of the spool 21 and the housing 6. Narrower than the compartment 19, the inserted coil-wound spool 21 is spaced inwardly from the side of the compartment and surrounded outwardly of the end abutments 25 by an annular space 31 generally U-shaped in cross-section and having as its inturned end legs the wedge-shaped slots 30.

With positioning pins or plugs (not shown) inserted into opposite ends of the spool 21 through aligned end openings 32 in the housing 5, the space 31 is impregnated, injected or otherwise filled with an epoxy or other suitable resin 33, suitably under vacuum and preferably after spraying or treating the surfaces of the compartment with a silicone or other release agent, such for an epoxy resin as Dow Corning #7 or #20 dissolved in xylol. On hardening, the resin not only forms a protective coating on the coil 20 and spaces the coil and the spool 21 from the side of the compartment 19 but in the slots 30 forms inwardly flaring wedges inwardly engaging the abutments 24 and 25 and effectively locking or wedging the spool against both lateral or transverse and vertical movement relative to the housing 5. Since not bonded to the housing 5, the resin coating is not subject to stress cracking by the difference between its and the housing's coefficients of expansion and avoiding cracking from direct contact with the spool 21 involves only making the spool of a plastic or other suitable material, such as "Nylon", having substantially the same coefficient as the resin and also preferably lubricious.

With the coil 20, spool 21 and lower O-ring 28 encapsulated in the resin 33 and the spool centered on and locked or wedged against movement relative to the housing 5, on removal of the centering pins and attachment or connection of the housing 5 to the base 2 by the plug 8, the lower part of the cylindrical bore 24 of the spool and the underlying concentric or coaxial and coradial cylindrical lower end opening 32 in the housing together serve as a fixed cylindrical guideway for slidably receiving and guiding in its reciprocable axial movement a magnetic solenoid plunger or valve member 34. A headed magnetic coil or core pole 35, screwed through the upper of the end openings 32, fits or seats in the upper part of the bore 24, with the joint between it and the spool 21 sealed by the previously inserted upper O-ring 27.

In the illustrated valve 1, the coil pole 35 has in its upper end an exhaust port 36 and on and downstanding from its lower end an upper valve seat 37, and fluid connects the port and seat through an axial way or drilling 38, all coaxial or concentric with the bore 24 of the spool 21. The preferred plunger 34 is machined from square stock with concentric or coaxial cylindrically curved corners 39 slidably engaging the bore 24 and intervening flats or flat sides 40 forming with the bore side passageways 41 for passing fluid past the plunger from the valve chamber 13 to the upper valve seat 37. With rubber or like insets 42 in its opposite ends for alternately engaging and closing the upper and lower valve seats 37 and 14, the plunger 34 extends or projects downwardly into the valve chamber 13 and has on its lower portion a restricted neck 43, ending in a radially outstanding bottom flange 44 for respectively accommodating and seating a lower end of a suitably coil return spring 45 reacting upwardly against the housing 5.

In the operation of the valve 1 as a normally closed valve, fluid will enter through the inlet port 3, and normally be blocked from passing through the lower valve seat 14 by closing of that seat by the plunger 34 in its normal, retracted or lower position under force of the return spring 45. Energizing of the solenoid 6 will shift the plunger 34 to its upper position, in process opening the lower seat 14 and closing the upper seat 37 and enabling fluid to flow through the valve from the inlet port 3 to the outlet port 4. On subsequent denergizing of the solenoid 6, the plunger will return to its normal lower position and, with the upper valve seat 37 then open, enable fluid in the line beyond the outlet port 4 to be exhausted through the exhaust port 36. In its alternate mode as a normally open valve, the plunger 34 will still normally seat against the lower seat 14 and the port 4 will still be the outlet port, but the port 36 will be the inlet port and the port 3 the exhaust port. In either mode, fluid is either exhausted or received through the bore 24 of the coil spool 21. The encapsulating resin 33 on hardening shrinks sufficiently to leak fluid around the lower end of the spool 21, even though still effective to lock the spool against relative movement in the housing 6. However, any such leakage is entirely prevented and the valve enabled to operate as intended by the compressed lower seal 28.

From the above detailed description it will be apparent that there has been provided an improved solenoid-actuated valve in which a solenoid coil, prewound on a spool, is inserted uncoated into a housing and there impregnated with an epoxy or like resin, which on hardening not only forms a protective coating for the coil but wedges the spool against movement relative to the housing. It should be understood that the described and disclosed embodiment is merely exemplary of the invention and that all modifications are intended to be included that do not depart from the spirit of the invention and the scope of the appended claims.

Having now described my invention, I claim:

1. A solenoid-actuated valve comprising a solenoid housing, a spool in said housing and having an axial bore, a plunger slidably reciprocable in and guided by said bore, a coil wound on said spool, and resin means in said housing and encapsulating said spool and coil, said resin means including inwardly flaring wedge means in said housing at opposite ends of said spool, and abutment means on and projecting beyond opposite ends of said spool and engaged by inner ends of said wedge means, said wedge means acting against said housing and axially and laterally on said spool for wedging said spool and therethrough said bore thereof against movement relative to said housing.

2. A solenoid-actuated valve according to claim 1, wherein the wedge means are inturned opposite end legs of the encapsulating resin, and including inwardly flaring wedge-shaped annular slots in the housing at opposite ends of the spool, each of the slots being bounded inwardly by one of the abutment means and receiving one of said end legs.

3. A solenoid-actuated valve according to claim 1, wherein the coil is prewound on the spool and therewith inserted uncoated into a compartment in the housing through a side opening therein, and the resin is injected into said compartment after inserting the spool and coil thereinto and pretreating exposed surfaces of said compartment with a release agent.

4. A solenoid-actuated valve according to claim 1, including a base mounting the housing, and plug means in said base and connecting the housing thereto, and the spool includes a barrel having said axial bore, and upper and lower annular end flanges projecting outwardly from opposite ends of said barrel and each backing an adjoining of the abutment means, and the valve including a coil pole in an upper end and said plunger in a lower end of said bore, said plunger extending into said base and reciprocating between a lower valve seat on said connecting plug and an upper valve seat on said coil pole for alternately closing said seats.

5. A solenoid-actuated valve according to claim 4, including side passageways between the plunger and bore for bypassing the plunger, and wherein a lower of the abutment means is bifurcated for receiving an O-ring inserted under compression into the compartment with the spool and encapsulated therewith in the resin for compression sealing about said bore between a lower end of said spool and the housing.

6. A solenoid-actuated valve according to claim 1, wherein fluid is passed through the bore of the spool in operation of the valve, and including sealing means inserted under compression with said spool into said housing for compression sealing about said bore between a lower end of the spool and the housing.

* * * * *